Dec. 25, 1962　　　　O. KLUCK　　　　3,070,223

ARRANGEMENT ON CASES FOR RECORDS TO FACILITATE THE PLACING THEREOF ON RECORD PLAYERS

Filed July 8, 1960　　　　2 Sheets-Sheet 1

INVENTOR

Otto Kluck

By

Lowry & Rinehart

ATTYS.

Dec. 25, 1962 O. KLUCK 3,070,223

ARRANGEMENT ON CASES FOR RECORDS TO FACILITATE THE PLACING THEREOF ON RECORD PLAYERS

Filed July 8, 1960 2 Sheets-Sheet 2

INVENTOR
Otto Kluck
BY Lowry & Rinehart
ATTYS.

United States Patent Office 3,070,223

Patented Dec. 25, 1962

3,070,223
ARRANGEMENT ON CASES FOR RECORDS TO FACILITATE THE PLACING THEREOF ON RECORD PLAYERS

Otto Kluck, Ihme, near Hannover, Germany

Filed July 8, 1960, Ser. No. 41,588
2 Claims. (Cl. 206—62)

This invention relates to record cases and particularly to an arrangement on cases for records to facilitate the placing thereof on record players.

The placing of records on a record player was hitherto effected by bringing the record near the turntable spindle of the record player and then, as one does not succeed immediately in finding the turntable spindle to slip into the central hole of the record, by endeavouring to bring the central hole in concentric position to the spindle. This frequently takes some time and results in an annoying delay in setting the player into operation. In the case of record-changers the placing of a series of, for example, ten records in position generally takes several minutes as each record must be picked up separately and slipped on to the turntable spindle of the record player.

The object of the invention is to overcome this objection and enable all the records in a case to be placed on the record player quickly and carefully by a single manipulation. This object is attained according to the invention by the provision of an arrangement on cases for records to facilitate the placing thereof on a record player, which comprises an under part of elongated rectangular plan form, an upper part also of elongated rectangular form and adapted to be slipped on to said under part, guides for the turntable spindle of said record player arranged on each of the two broad side walls of said under part, said guides extending to recesses cut out in a semicircular curved line in the middle of the upper edge of each broad side wall, the distance of the centre of the curved lines of the said recesses from the bottom of said under part of said case being equal to half the diameter of the records inserted in said case and the radius of said cut-out recesses corresponding to half the diameter of said turntable spindle of said record player.

The guides can be formed in a number of different ways. In cases for records with large central holes which are placed on record players with a turntable spindle of correspondingly large diameter, the upper edges of the under part of the case can be advantageously constructed to form guides for the turntable spindle. After removal of the upper part of the case, the exposed portion of the underside of the undermost record is placed loosely on the turntable spindle and then the under part is pushed towards the turntable spindle with the edge of the downwardly directed broad side wall in contact with the turntable spindle and moved laterally so far that the arcuate central recesses of both side walls come within the range of the turntable spindle. The under part of the case now slides downwards with the records onto the turntable spindle and can be pulled forwards away from the same and off the records held back by said turntable spindle. The placing on of a series of records can be carried out in this manner much more quickly and conveniently than heretofore and in addition the records are also more carefully handled because they are not touched with the hand at all when being placed on the record player.

In cases for records with a small central hole to be placed on a correspondingly thin turntable spindle of the record player, it is advantageous to form the guides for the turntable spindle in the shape of two edges converging at an angle on the outer surface of each of the broad side walls of the case and to arrange the guide edges so that their imaginary extensions intersect above the upper edge of the broad side walls in the centre of the curvature of the arcuate lines defining the recesses in the broad side walls. In this case the under part of the case with the pack of records in it, is laid on the turntable spindle with the downwardly facing broad side wall, is brought by a short sliding movement with one of the guide edges on the broad side wall facing downwards to bear against the turntable spindle and then moved forward so that the guide edge slides along the turntable spindle. When the arcuate edge recesses in the broad side walls and the central record holes located concentrically to the edge recesses are accurately in register with the turntable spindle, the under part of the case with the records therein slips downwards on to the turntable spindle and the under part of the case can be pulled off the records held back by the turntable spindle.

The form of construction with guides arranged on the two broad side walls presents not only the advantage of enabling a series of records to be placed on quickly and conveniently, but also the further advantage that the sound grooves of the records cannot become damaged by the turntable spindle because the underside of the undermost record does not come into contact with the turntable spindle. The danger of the sound grooves becoming damaged is in the case of a turntable spindle of small diameter considerably greater than in the case of a turntable spindle of large diameter.

The removal of the records from the player can also be effected without touching the records with the hands if, according to a further suggestion of the invention, the under part of the record case is so equipped that the records can easily be taken up by it and directly removed from the turntable spindle. To render the under part of the case suitable for this purpose it is advisable to make the narrow end walls slightly lower than the broad side walls and to round the upper projecting corners of the broad side walls. To facilitate the slipping of the downwardly directed broad side wall of the under part of the case under the stack of records to be removed from the record player, the edge portions of the rounded corners and the upper edges of the two broad side walls can be chamfered on the inner side.

A preferred embodiment of the invention will now be described by way of example and with reference to the accompanying drawings, in which.

Figures 1, 5:
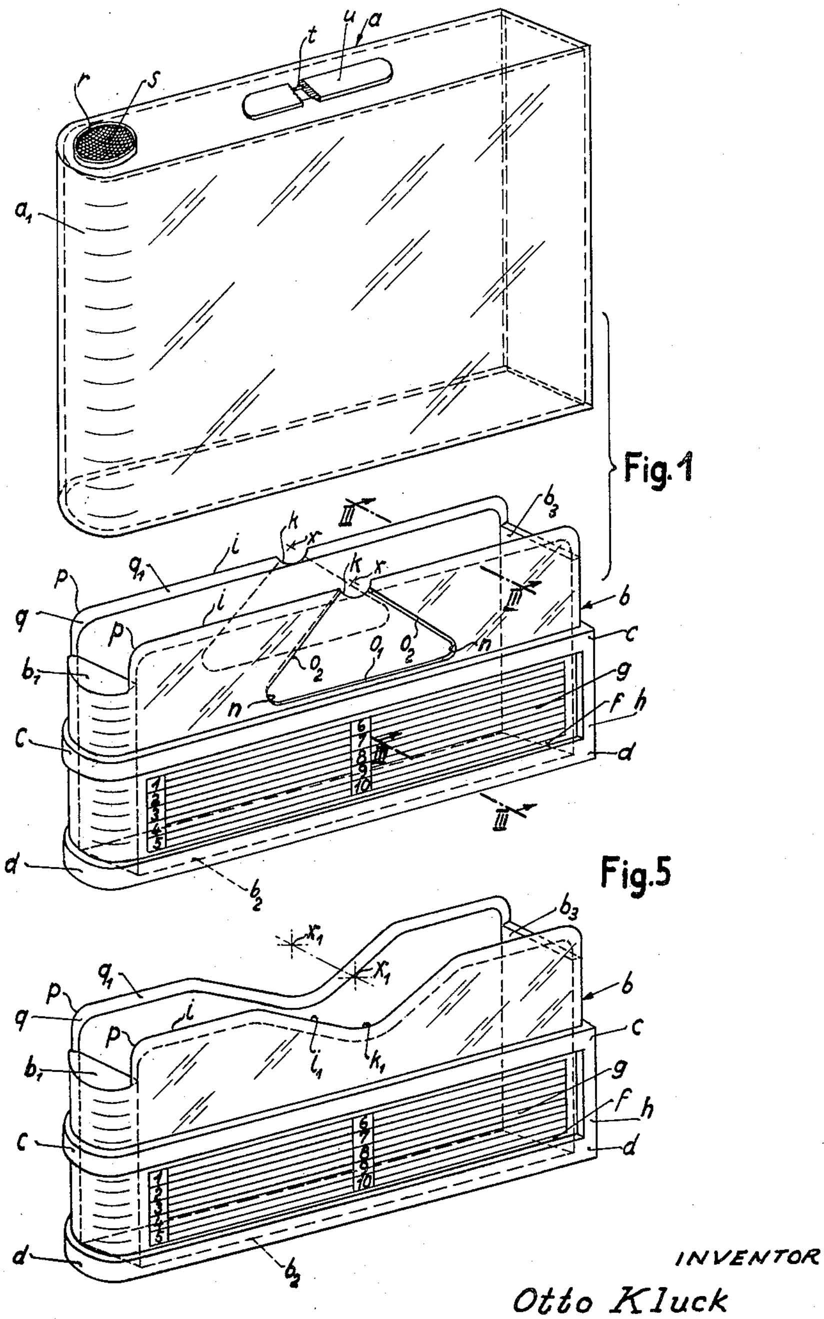
FIG. 1 is a perspective view of a record case according to the invention, with the upper part of the case lifted off the under part of the case.
FIG. 5 is a perspective view showing an under part of the case with modified construction of the guides for the turntable spindle.

The case for storing a plurality of records, for example ten records, is made from synthetic plastic material, cardboard or other suitable stiff material and comprises an upper part *a* to be used as slip-on cover and an under part *b*. The two parts *a* and *b* of the case are made in elongated rectangular plan form and rounded on one end wall of each part, $a_1$ and $b_1$, like the back of a book, the end wall $b_1$ of the under part of the case being provided with a considerably thicker wall thickness than the other walls of the under part of the case.

The under part *b* of the case is of a height which is approximately equal to half the diameter of the records to be accommodated in it. A first rib *c* extending at half the height across both the broad side walls and the rounded narrow end wall $b_1$ parallel to a bottom $b_2$ of the under part *b* of the case, serves as abutment for the upper part *a* of the case. This latter is of such a height that the portion of the upper part slipped on to the lower part of the case and projecting beyond the upper edge of the broad side walls of the under part *b* of the case is also equal to half the diameter of the records, so that the records placed in the under part *b* of the case and completely filling the under part of the case in breadth and depth are, when the case is closed, secured against movement even in vertical direction.

A second rib *d* corresponding to the rib *c* is formed on the bottom edge of the under part *b* of the case and serves for adding to the stiffness or reinforcing of the under part of the case. The two ends of the ribs *c* and *d* on both sides of the under part of the case, in the region of a flat or level end wall $b_3$ are connected by a cross web or rib *h*. The area defined by the two ribs *c* and *d* and the cross rib *h* connected them, serves for affixing a strip *f* of paper or the like.

This strip *f* is pasted on both broad side walls and on the rounded end side $b_1$ between the two ribs *c* and *d* and information concerning the matter recorded on the records contained in the case is typed or written on portions *g* of the strip *f* located on the broad side walls, i.e. information concerning the front side of the record on one portion of the strip and information concerning the back of the record, on the other portion of the strip. The portion of the strip on the rounded end wall $b_1$ is preferably provided for information concerning the type of records contained in the case, for example, dance music, classical music, speeches or lectures by Mr. N. and so forth.

To enable any desired case to be removed from a series of cases standing close together side by side on a shelf or in a cabinet, a depression *r* is provided in the top of the upper slip-on part *a* of the case near the rounded end wall $a_1$, to afford a hold for a finger of the hand pulling out the case. The synthetic plastic material in the region of the depression *r* is preferably roughened, for example provided with a checkered knurling *s* as shown in the drawing, for preventing the finger from slipping.

The relatively great height of the upper slip-on part *a* makes its manufacture from synthetic plastic material in a mould difficult in that, in view of the long stroke of the press die or ram, the wall thicknesses of the broad side wall and the flat end wall may turn out irregular, that is too thin in some places. For this reason it has been found advisable to provide an additional guide for the press ram. As a result, an elongated slot-shaped aperture *t* is produced in the middle of the top of the upper slip-on part of the case. This is filled by a suitably shaped strip *u* made of synthetic plastic material and offset at the edges which is resiliently clamped or glued with its lower part having the smaller cross-sectional area, in the aperture *t*. The upper surface of the strip can be used for advertising purposes, for example, by embossing the name of the makers of the records thereon.

Figures 2, 3, 4:
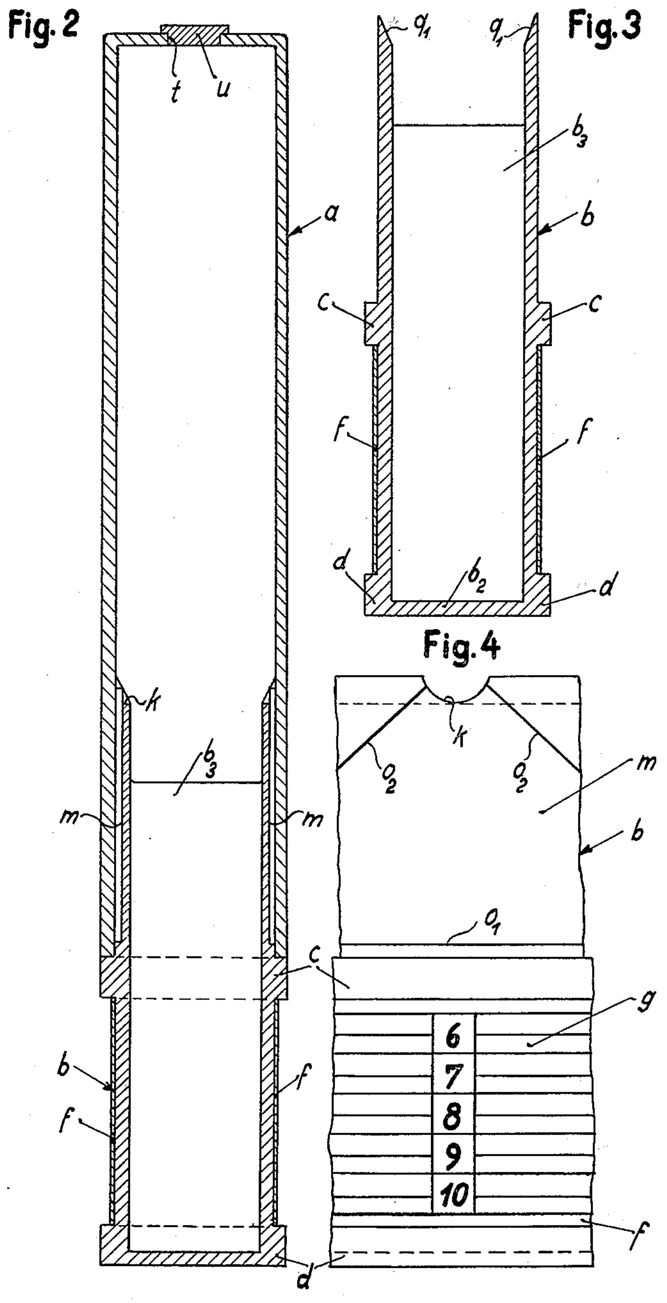
FIG. 2 is a central vertical section, on a larger scale, through the record case with the upper part slipped onto the under part of the case.
FIG. 3 is a vertical section through the lower part of the case taken on line III—III of FIG. 1 and viewed in the direction of the arrow.
FIG. 4 is a front elevational view of the middle portion of the under part of the case.

Each of the two broad side walls of the under part *b* of the case has an upper edge *i* in the middle of which is a cut-out portion *k* defined by an arcuate line. The centres from which the curved contour lines are drawn are coaxial to the centres of the holes in the middle of the records inserted in the under part of the case and resting on the bottom $b_2$ thereof. A recess *m* (FIG. 2) in the shape of an isosceles triangle symmetrical to the transverse central plane of the under part *b* of the case is formed by reducing the wall thickness underneath the cut-out portions *k* on the outer surface of each of the two broad side walls in the wall portion located above the rib *c*. A lower edge $o_1$ of the recess *m* extends near the rib *c* and parallel thereto. Two side edges $o_2$ of the recess *m* extending from rounded corners *n* at the ends of the lower edge $o_1$ are arranged in such a manner that their straight imaginary extensions intersect at a point *x* which coincides with the centre of curvature of the arcuate cut-out portion *k*.

When the under part *b* of the case is placed with the recess *m* of its broad side wall actually directed downwards on the turntable spindle of the record player, one or other of the edges $o_2$ will be brought into contact with the spindle by shifting the under part *b* of the case a short distance sideways. When the under part *b* of the case is now pulled forward with the turntable spindle being guided by this side edge $o_2$, the arcuate cut-out edge portions in which the recesses *m* terminate and the holes in the centre of all records contained in the under part of the case will positively get into a concentric position with respect to the turntable spindle, so that the case with the records it contains will slip downwards on to the turntable spindle. It is then only necessary to pull the under part *b* forwards away from the turntable spindle and off the records and in this manner a whole stack of records can be placed on the record player quickly and carefully by a single manipulation.

After one side of all the records placed on has been played, the stack of records can be removed from the record player in a similar easy, quick manner with the aid of the under part *b* of the case. To render this possible the rounded end walls $b_1$ and the end walls $b_3$ of the under part of the case opposite thereto are, as can be seen from FIG. 1 of the drawings, made less high than the broad side walls. Exposed upper corners *p* of the broad side walls are rounded and the wall thickness at the edge portions is reduced by being chamfered on the inner sides towards the inner edges at *q*. Similarly the straight upper edge portions *i* of the broad side walls are chamfered on one side at $q_1$.

If the under part *b* of a case is constructed in the manner described, it is possible without difficulty to slip the broad side wall which is actually directed downwards, from the front and from the side under the stack of records which have been played and are on the turntable spindle of the record player, and to slide the other, that is the upwardly directed broad side wall, over the uppermost record of the stack. The whole stack of records can thus be removed from the turntable spindle of the record player by only one single manipulation, without touching the individual records and without it being necessary to place the records in the under part of the case.

The upper part *a* of the case which is slipped on to the lower part *b* thereof, covers the recesses *m* and thus forms a dust-proof receptacle for the records, with the result that, even after storing for years, perfect sound reproduction is ensured. The sturdy case protects the records inserted therein against damage by external mechanical influences, particularly those caused by impacts and jolts.

The triangular recesses *m* with the guide edges $o_2$ can be produced by reducing the wall thickness or by stamping, or the guide edges may be formed by ribs, without departing from the fundamental idea of the invention.

The under part *b* of the case illustrated in FIG. 5 differs from that shown in FIG. 1 in that the upper edges *i* of the two broad side walls of the case are constructed to form guides for the turntable spindle. This latter is of much larger diameter than the turntable spindle used in connection with the under part *b* of the case shown in FIG. 1, which is intended for records with a small central hole.

In the under part of the case illustrated in FIG. 5 the edges *i* of the two broad side walls which first extend horizontally in a straight line, merge into curved intermediate portions $i_1$ and then into a central recess $k_1$ defined by an arcuate contour line the radius of which corresponds to half the diameter of the thick turntable spindle and is considerably larger than the radius of the arcuate line defining the edge recess $k$ in the under part of the case illustrated in FIG. 1. As a result, the central recess $k_1$ of the under part of the case shown in FIG. 5 has a centre of curvature $x_1$ which is at a greater distance from the upper edge $i$ of the broad side walls, the outer surfaces of which are flat with the exception of the ribs $c$ and $d$.

To bring the stack of records held in the under part $b$ of the case illustrated in FIG. 5 on to the turntable spindle, the under part of the case is laid on the spindle with a portion of the edge $i$ against the spindle, the under side of the record undermost in the stack being supported on the flattened end surface of the turntable spindle. By shifting the under part $b$ sideways and guiding it by the turntable spindle along an edge portion $i$ and further along the intermediate portion $i_1$ extending therefrom to the centre, the edge recesses $k_1$ and the central holes of the records are brought into register with the turntable spindle and all the records held in the under part $b$ of the case will slip on to the turntable spindle; the under part of the case can then be pulled off towards the front. The removal of the stack of records after they have been played is effected in the same manner as in the case of the under part illustrated in FIG. 1. The parts which are the same in the two forms of constructions of the under part of the case are designated by the same reference characters in FIG. 5 as in FIG. 1.

The invention may be embodied in other specific forms without departing from the spirit or essential characteristics thereof. The present embodiment is therefore to be considered in all respect as illustrative and not restrictive, the scope of the invention being indicated by the appended claims rather than by the foregoing description and all changes which come within the meaning and range of equivalency of the claims are therefore intended to be embraced therein.

I claim:

1. A record case of substantially rectangular form to facilitate the positioning of disc records on the turntable spindle of a record player comprising an under part and a slip-on cover part to completely close the under part, the broad side walls of the under part being provided with recesses defined by arcuate lines and open to one side and coaxially arranged with respect to the central holes of the records to be inserted, the radii of curvature of the arcuate lines corresponding to half the diameter of the turntable spindle, the under part of the case being dimensioned to house on a half portion of a record and guides on the broad sides of the case extending radially with respect to the arcuate lines and defining the central recesses for centering the case and records relative to the spindle of a record player, guides for the turntable spindle at the outer surfaces of the broad side walls of the under part of the case that lead to said recesses, the guides extending at an angle and meeting in the zone of the recess and at a distance from each other corresponding to the diameter of the turntable spindle.

2. Apparatus as in claim 1, wherein the guides are in the form of triangular depressions symmetrical to the vertical longitudinal middle axis of the under part of the case.

References Cited in the file of this patent

UNITED STATES PATENTS

| | | |
|---|---|---|
| 2,555,594 | Markovitz | June 5, 1951 |
| 2,670,261 | Mueller | Feb. 23, 1954 |
| 2,725,143 | Linebaugh | Nov. 29, 1955 |
| 2,763,524 | Beers | Sept. 13, 1956 |